(12) United States Patent
Reimann et al.

(10) Patent No.: US 8,678,967 B2
(45) Date of Patent: Mar. 25, 2014

(54) POWER SPLIT GEARBOX FOR A MOTOR VEHICLE

(75) Inventors: Mario Reimann, Wetter (DE); Alexander Baar, Hagen (DE); Andreas Meise, Bochum (DE); Stefan Frank, Iserlohn (DE); Manuel Matalla, Witten (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/817,530

(22) PCT Filed: Jul. 21, 2011

(86) PCT No.: PCT/EP2011/003652
§ 371 (c)(1),
(2), (4) Date: May 8, 2013

(87) PCT Pub. No.: WO2012/022414
PCT Pub. Date: Feb. 23, 2012

(65) Prior Publication Data
US 2013/0225351 A1    Aug. 29, 2013

(30) Foreign Application Priority Data
Aug. 19, 2010 (DE) .......... 10 2010 034 751

(51) Int. Cl.
*F16H 3/72* (2006.01)
*F16H 47/04* (2006.01)
(52) U.S. Cl.
USPC ................................. 475/1; 475/72

(58) Field of Classification Search
USPC ................................................... 475/1, 72
See application file for complete search history.

(56) References Cited

U.S. PATENT DOCUMENTS

| 3,675,507 A | 7/1972 | Takekawa |
| 2002/0119856 A1 * | 8/2002 | Pollman et al. ............ 475/72 |
| 2005/0043133 A1 * | 2/2005 | Weeramantry ............ 475/72 |
| 2011/0118073 A1 * | 5/2011 | Meise et al. ............ 475/207 |

FOREIGN PATENT DOCUMENTS

| DE | 10 2008 021 010 B4 | 2/2010 |
| FR | 2 793 861 A1 | 11/2000 |

OTHER PUBLICATIONS

International Search Report corresponding to PCT Application No. PCT/EP2011/003652, mailed Aug. 19, 2011 (German and English language document) (5 pages).

\* cited by examiner

*Primary Examiner* — Edwin A Young
(74) *Attorney, Agent, or Firm* — Maginot, Moore & Beck

(57) ABSTRACT

A power split gearbox, in particular for a motor vehicle, includes a mechanical power branch and a hydrostatic power branch. The mechanical power branch and hydrostatic power branch, in a parallel arrangement with respect to one another, are in contact with a common drive shaft. The branched power from the mechanical power branch and hydrostatic power branch are combined in a gear drive arranged on an end side. The mechanical power branch has two planetary gear sets with sun gears, planet gears and internal gears. A clutch is arranged on a side of one of the two planetary gear sets. An internal gear is connected to a sun gear shaft by the clutch.

6 Claims, 1 Drawing Sheet

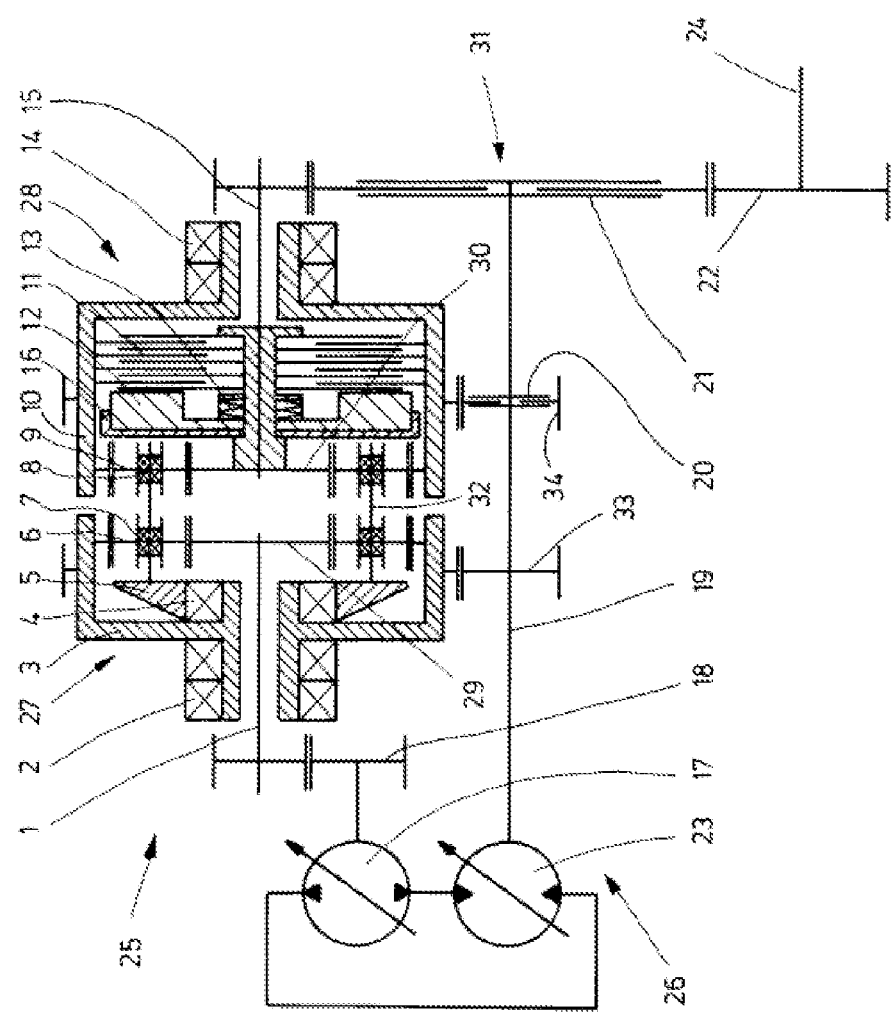

POWER SPLIT GEARBOX FOR A MOTOR VEHICLE

This application is a 35 U.S.C. §371 National Stage Application of PCT/EP2011/003652, filed on Jul. 21, 2011, which claims the benefit of priority to Serial No. DE 10 2010 034 751.5, filed on Aug. 19, 2010 in Germany, the disclosures of which are incorporated herein by reference in their entirety.

BACKGROUND

The disclosure relates to a power split gearbox, in particular for a motor vehicle, having a mechanical power branch and a hydrostatic power branch which, arranged in parallel to one another, are in contact with a common drive shaft, the hydrostatic power branch comprising a hydraulic motor which is coupled to a hydraulic pump and being connected to the drive shaft via a gearwheel stage, it being possible for the branched power from the mechanical and hydrostatic power branch to be routed together into a gear drive which is arranged on the end side and is connected subsequently by an output shaft, the mechanical power branch comprising two epicyclic gear mechanisms with sun gears, planetary gears and internal gears, the sun gear of the first epicyclic gear mechanism being positioned directly on the drive shaft, whereas the sun gear of the second epicyclic gear mechanism is in contact with the gear drive via a sun gear shaft, and the planetary gears of both epicyclic gear mechanisms being arranged coaxially and being mounted on a common planetary carrier shaft, the planetary carrier shaft on the side of the first epicyclic gear mechanism being mounted via a planet spider in the internal gear of the first epicyclic gear mechanism, and a clutch being arranged on the side of the second epicyclic gear mechanism.

A power split gearbox of this type is known from DE 10 2008 021 010 B4. In addition to a first epicyclic gear mechanism, said power split gearbox has a second epicyclic gear mechanism, the planetary gears of which can be connected via a clutch to the sun gear shaft of the second epicyclic gear mechanism.

SUMMARY

The disclosure is based on the object of providing a power split gearbox which requires a smaller amount of installation space than the prior art.

This object is achieved by virtue of the fact that the second internal gear can be connected to the second sun gear shaft by way of the clutch. As a result of this connection, the torque to be transmitted by said clutch is lower than in the prior art, in which the planetary gears of the second epicyclic gear mechanism are connected to the sun shaft by said clutch. The reason for this is that, in the prior art, the internal gear of the second epicyclic gear mechanism freewheels and, as a result, the entire torque of the planetary gears of both epicyclic gear mechanisms has to be transmitted to the sun shaft by the clutch. As a result of the refinement according to the disclosure, the fact that the sun gear shaft is connected to the internal gear of the second epicyclic gear mechanism achieves a division of the torque which is introduced by the planetary gears to the sun shaft and the internal gear of the second epicyclic gear mechanism. Part of the torque is therefore introduced directly into the sun shaft, it not being necessary for this portion to be transmitted by the clutch. As a result, the clutch including the actuating apparatus can be of (even) smaller configuration in comparison with the prior art, which results in a reduction in the amount of installation space which is required.

In one development of the disclosure, an intermediate ring is arranged between the planetary gears of the second epicyclic gear mechanism and the clutch. In a further refinement, a piston for actuating the clutch is supported on said intermediate ring. Here, the intermediate ring can also be divided in two in such a way that disk which is freely movable with respect to the intermediate ring faces the planetary gears of the second epicyclic gear mechanism and in which the axles of the planetary gears are mounted is arranged on the intermediate ring which interacts with the piston. This refinement also achieves a further reduction in installation space, since a planet spider which is arranged in the first internal gear and to which the axles of the planetary gears are fastened can then be dimensioned to be smaller.

In one development of the disclosure, the piston is actuated hydraulically. Here, in a further refinement, a hydraulic feed takes place through a hydraulic feed line which is incorporated into the sun shaft. A feed of this type can be realized without problems, it however also being provided in the context of the disclosure to realize the hydraulic feed by way of the internal gear of the second epicyclic gear mechanism. Here, the intermediate ring is then not attached to the sun shaft, but rather to the second internal gear, and the intermediate ring is freely movable with respect to the sun gear shaft. By way of a continuing line in the second internal gear, the hydraulic fluid can then be introduced into the corresponding line at a suitable point, for example next to the bearing point of the second internal gear.

Further advantageous refinements of the disclosure can be gathered from the description of the drawing, in which one exemplary embodiment of the disclosure which is shown in the FIGURE is described in greater detail.

BRIEF DESCRIPTION OF THE DRAWINGS

The single FIGURE shows a diagrammatic view of the power split gearbox according to the disclosure.

DETAILED DESCRIPTION

The single FIGURE shows a diagrammatic view of the power split gearbox according to the disclosure which is arranged between the sun gear shaft, which forms the drive shaft 1, and an output shaft 24. Here, the power split gearbox has a mechanical power branch 25 and a hydrostatic branch 26. The hydrostatic branch 26 has a hydraulic pump 17 which is coupled hydraulically to a hydraulic motor 23, and is connected to the sun gear shaft 1 via a spur gear stage 18. The mechanical branch 25 is constructed from two epicyclic gear mechanisms 27 and 28, a sun gear 29 of the first epicyclic gear mechanism 27 being connected directly to the drive shaft 1 or being arranged on said shaft. On the output side, the second sun shaft 15, on which the sun gear 30 of the second epicyclic gear mechanism 28 is positioned, is coupled to the output shaft 24 by means of a gear drive 31. On the side of the hydrostatic power branch 26, a connection between the output-side shaft 19 and the output shaft 24 can be produced by means of a switchable clutch 21 with the gear drive 31. In order to correspondingly convert the power which is routed via the mechanical power branch 25, the planetary gears 6 and 9 of the two epicyclic gear mechanisms 27 and 28 are coaxially mounted jointly on a planetary carrier shaft 32 via antifriction bearings 7 and 8. The planetary carrier shaft 32 is mounted via a planet spider 5 via an antifriction bearing 4 in a housing part of the first internal gear 3. Furthermore, the first internal gear 3 is mounted via an antifriction bearing 2 in a housing (not shown) for the entire power split gearbox.

An intermediate ring 16 is arranged and fastened on the sun gear shaft 15 of the second epicyclic gear mechanism 28, the intermediate ring 16 being designed as a support for a piston 12. The piston 12 is extended with respect to the intermediate ring 16 by the supply of hydraulic fluid through the sun gear shaft 15 and presses the clutch disks of a clutch pack 11 against one another. As a result, a rotary connection is produced between the sun gear shaft 15 and the internal gear 10 of the second epicyclic gear mechanism 28. The clutch is released by a spring 13 which, after the hydraulic pressure is switched off, presses the piston 12 back to the intermediate ring 16. Just like the first internal gear 3, the second internal gear 10 is mounted via a bearing 14 in the housing for the power split gearbox.

In addition, the internal gears 3 and 10 in each case have a toothing system on their outer circumference. Via said toothing system, the internal gear 3 is connected permanently via a gearwheel 33 to the output-side shaft 19 of the hydrostatic power branch 26. In addition, coupling can be produced via a further clutch 20 between the output-side shaft 19 and the internal gear 10 of the second epicyclic gear mechanism 28 by means of a gearwheel 34.

By means of the arrangement which is shown, power can be summed via three paths:

In order to configure a first transmission ratio, the clutch 21 is closed, whereas the two clutches 20 and 11 are open. In this case, the force flow takes place via the hydrostatic power branch 26, since no power transmission takes place in the region of the mechanical power branch 25 on account of the freely rotating internal gear 10.

In order to configure a second transmission ratio, the clutch 11 is closed, whereas the two other clutches 20 and 21 are open. Bundling of the force flow takes place in the first epicyclic gear mechanism 27, which force flow is composed firstly of the portion which is introduced via the sun gear 29 and secondly of a drive of the internal gear 3 by the hydrostatic power branch 26 via the gearwheel 33. On account of the closed clutch 11, this summed power is divided by means of the planetary carrier shaft 32 to the sun gear shaft 15 and the internal gear 10 and, by way of the closed clutch 11, the portion of the power which is introduced into the internal gear 10 is likewise transmitted via the sun gear shaft 15 and the gear drive 31 into the output shaft 24.

A further transmission ratio can be produced by the clutch 20 being closed, whereas the clutches 11 and 21 are open. In this case, the internal gears 3 and 10 are operated in each case via the hydrostatic power branch 26, with the result that summing of the power from the sun gear 29 and the internal gear 3 takes place in the first epicyclic gear mechanism 27, which summing of the power is transmitted via the planetary carrier shaft 32 to the second epicyclic gear mechanism 28. In the second epicyclic gear mechanism 28, said power is bundled together with the force flow via the internal gear 10 and is finally transmitted to the sun gear shaft 15. Starting from the sun gear shaft 15, the power is finally output via the gear drive 31 to the output shaft 24.

The invention claimed is:

1. A power split gearbox, comprising:
a mechanical power branch and a hydrostatic power branch arranged in parallel to one another and in contact with a common drive shaft, wherein:
the hydrostatic power branch includes a hydraulic motor coupled to a hydraulic pump,
the hydrostatic power branch is connected to the drive shaft via a gearwheel stage,
branched power from the mechanical power branch and the hydrostatic power branch is routed together into a gear drive arranged on an end side and connected subsequently to an output shaft,
the mechanical power branch includes a first epicyclic gear mechanism with a first sun gear, first planetary gears and a first internal gear and includes a second epicyclic gear mechanism with a second sun gear, second planetary gears, and a second internal gear,
the first sun gear of the first epicyclic gear mechanism is positioned directly on the drive shaft,
the second sun gear of the second epicyclic gear mechanism is in contact with the gear drive via a sun gear shaft,
the first and second planetary gears are arranged coaxially and mounted on a common planetary carrier shaft,
the planetary carrier shaft is mounted on a side of the first epicyclic gear mechanism via a planet spider in the first internal gear of the first epicyclic gear mechanism,
a clutch is arranged on a side of the second epicyclic gear mechanism, and
the second internal gear is configured to connect to the sun gear shaft by way of the clutch.

2. The power split gearbox as claimed in claim 1, further comprising an intermediate ring arranged between the second planetary gears and the clutch.

3. The power split gearbox as claimed in claim 2, further comprising a piston configured to actuate the clutch and supported on the intermediate ring.

4. The power split gearbox as claimed in claim 3, wherein the piston is actuated hydraulically.

5. The power split gearbox as claimed in claim 4, wherein a hydraulic feed takes place through the sun gear shaft.

6. A drive train of a motor vehicle, comprising:
a power split gearbox including:
a mechanical power branch and a hydrostatic power branch arranged in parallel to one another and in contact with a common drive shaft, wherein:
the hydrostatic power branch includes a hydraulic motor coupled to a hydraulic pump,
the hydrostatic power branch is connected to the drive shaft via a gearwheel stage,
branched power from the mechanical power branch and the hydrostatic power branch is routed together into a gear drive arranged on an end side and connected subsequently to an output shaft,
the mechanical power branch includes a first epicyclic gear mechanism with a first sun gear, first planetary gears and a first internal gear and includes a second epicyclic gear mechanism with a second sun gear, second planetary gears, and a second internal gear,
the first sun gear of the first epicyclic gear mechanism is positioned directly on the drive shaft,
the second sun gear of the second epicyclic gear mechanism is in contact with the gear drive via a sun gear shaft,
the first and second planetary gears are arranged coaxially and mounted on a common planetary carrier shaft,
the planetary carrier shaft is mounted on a side of the first epicyclic gear mechanism via a planet spider in the first internal gear of the first epicyclic gear mechanism, a clutch is arranged on a side of the second epicyclic gear mechanism, and the second internal gear is configured to connect to the sun gear shaft by way of the clutch.

* * * * *